United States Patent
Baek et al.

(10) Patent No.: US 8,623,531 B2
(45) Date of Patent: Jan. 7, 2014

(54) BATTERY PACK

(75) Inventors: Woonseong Baek, Yongin-si (KR); Bumkuk Choi, Yongin-si (KR); Sangjoo Lee, Yongin-si (KR)

(73) Assignee: Samsung SDI Co. Ltd., Gyeonggi-do (KR)

( * ) Notice: Subject to any disclaimer, the term of this patent is extended or adjusted under 35 U.S.C. 154(b) by 1204 days.

(21) Appl. No.: 12/275,515

(22) Filed: Nov. 21, 2008

(65) Prior Publication Data

US 2009/0155631 A1    Jun. 18, 2009

(30) Foreign Application Priority Data

Dec. 14, 2007 (KR) ................ 2007-131356

(51) Int. Cl.
*H01M 10/40* (2006.01)

(52) U.S. Cl.
USPC .............................. 429/7; 429/163

(58) Field of Classification Search
USPC ................. 429/7, 61, 62, 163, 175
See application file for complete search history.

(56) References Cited

U.S. PATENT DOCUMENTS

| | | | |
|---|---|---|---|
| 2004/0251872 A1 | 12/2004 | Wang et al. | |
| 2007/0020509 A1* | 1/2007 | Kim ................ | 429/62 |
| 2008/0233472 A1* | 9/2008 | Ota et al. ........... | 429/122 |

FOREIGN PATENT DOCUMENTS

| | | |
|---|---|---|
| EP | 1 657 776 | 5/2006 |
| EP | 1 814 189 | 8/2007 |
| JP | 2006-147193 | 6/2006 |
| JP | 2006-156326 A | 6/2006 |
| JP | 2006-164531 A | 6/2006 |
| JP | 2006147193 | * 6/2006 ............. H01M 2/10 |
| KR | 2006-0032591 A | 4/2006 |
| KR | 2006-0123012 A | 12/2006 |
| KR | 10-0723668 | 5/2007 |
| KR | 10-0723668 A | 5/2007 |
| KR | 10-2007-0072426 | 7/2007 |
| WO | 2004/112182 A1 | 12/2004 |

OTHER PUBLICATIONS

English-language Abstract of KR 10-2006-0032591.
Office Action dated Feb. 21, 2012 of corresponding Japanese Patent Application No. 2008-316576—1 page.

* cited by examiner

*Primary Examiner* — Ula C Ruddock
*Assistant Examiner* — Frank Chernow
(74) *Attorney, Agent, or Firm* — Knobbe, Martens, Olson & Bear LLP (57) ABSTRACT

A battery pack that does not increase contact resistance when an impact is applied to a bare cell and a protection circuit module. The battery pack includes: a bare cell having a surface on which at least one coupling groove is formed; a protection circuit module electrically connected to the bare cell; at least one coupling member having one end coupled to the protection circuit module and another end in which at least one coupling hole corresponding to the at least one coupling groove of the bare cell is formed, and tightly adhered to the bare cell; at least one screw bolt coupled to the at least one coupling groove through the at least one coupling hole; and at least one space formed in an opening part of the at least one coupling groove, having a diameter greater than that of the coupling groove. Therefore, the battery pack does not increase the contact resistance between the bare cell and the protection circuit module against an external impact.

8 Claims, 8 Drawing Sheets

BATTERY PACK

CROSS-REFERENCE TO RELATED APPLICATION

This application claims the benefit of Korean Patent Application No. 2007-131356, filed on Dec. 14, 2007, in the Korean Intellectual Property Office, the disclosure of which is incorporated herein by reference.

BACKGROUND OF THE INVENTION

1. Field of the Invention

Aspects of the present invention relate to a battery pack, and more particularly, to a battery pack that does not increase contact resistance against an external impact.

2. Description of the Related Art

Currently, portable electrical/electronic devices, which are compact and light, such as cellular phones, notebook computers, camcorders, and the like, are actively being developed and produced. Accordingly, a battery pack is embedded in the portable electrical/electronic devices so that the portable electrical/electronic devices may operate in a place where a separate power source is not provided. The battery pack currently adopts a rechargeable secondary battery by considering an economical aspect. Representative examples of the secondary battery are a nickel-cadmium (Ni—Cd) battery, a nickel-metal hydride (Ni-MH) battery, a lithium (Li) battery, a lithium-ion (Li-ion) secondary battery, and the like. Particularly, an operating voltage of the lithium-ion (Li-ion) secondary battery is greater, about three times, than the operating voltage of the nickel-cadmium (Ni—Cd) battery or the nickel-metal hydride (Ni-MH) battery, which is frequently used as a power source of portable electronic apparatuses. Also, since the energy density per unit weight is relatively greater, the lithium-ion (Li-ion) secondary battery is being widely used.

The secondary battery, as such, generally uses lithium-based oxide as positive electrode active materials and carbon material as negative electrode active materials. Generally, batteries are classified into a liquid electrolytic battery and a polymer electrolytic battery according to the type of electrolyte. In this instance, the battery using the liquid electrolyte is referred to as the lithium-ion (Li-ion) secondary battery, and the battery using the polymer electrolyte is referred to as a lithium polymer battery.

The secondary battery is formed by electrically connecting a bare cell formed by sealing a can accommodating an electrode assembly and electrolyte, and a protection circuit module. The bare cell charges/discharges electricity using a chemical reaction. The protection circuit module controls charging/discharging of the bare cell and prevents overcharging/overdischarging of the bare cell to protect the bare cell.

When the bare cell and the protection circuit module are connected to form the secondary battery, electrical resistance therebetween is reduced in order to improve charging/discharging efficiency. In more detail, if the electrical resistance between the bare cell and the protection circuit module increases, the charging/discharging efficiency of the bare cell is reduced.

Meanwhile, the secondary battery goes through a reliability test for determining whether the secondary battery is stable against an impact in order to mount the secondary battery in an electronic product after being formed in a pack by integrally connecting the bare cell and the protection circuit module. The battery pack increases the electrical resistance between the bare cell and the protection circuit module due to an external impact. The electrical resistance increases as contact resistance increases in a part where the bare cell and the protection circuit module are connected.

SUMMARY OF THE INVENTION

Aspects of the present invention are conceived to solve the above-described and/or other problems, and thus an aspect of the present invention is to provide a battery pack that does not increase contact resistance when an impact is applied to a bare cell and a protection circuit module.

Another aspect of the present invention is to provide a battery pack that enhances assembling and convenience of process simultaneously.

According to an aspect of the present invention, there is provided a battery pack comprising: a bare cell having a surface on which at least one coupling groove is formed; a protection circuit module electrically connected to the bare cell; at least one coupling member having one end coupled to the protection circuit module and another end in which at least one coupling hole corresponding to the at least one coupling groove of the bare cell is formed, and tightly adhered to the bare cell; at least one screw bolt coupled to the at least one coupling groove through the at least one coupling hole; at least one space formed in an opening part of the at least one coupling groove, having a diameter greater than that of the at least one coupling groove.

According to another aspect of the present invention, there is provided a battery pack comprising: a bare cell having a surface on which at least one coupling groove is formed; a protection circuit module electrically connected to the bare cell; at least one coupling member having one end coupled to the protection circuit module and another end in which at least one coupling hole corresponding to the at least one coupling groove of the bare cell is formed, and tightly adhered to the bare cell; a cover case surrounding the protection circuit module, having a surface in which at least one receiving groove is formed, and having at least one hole passing through the center of the at least one receiving groove; at least one screw bolt disposed in the at least one receiving groove through the at least one hole, passing through the at least one coupling hole, and coupled to the at least one coupling groove through the at least one coupling hole; and at least one space having a diameter greater than that of the at least one coupling groove formed in an opening part of the at least one coupling groove.

The at least one screw bolt includes body part having a screw thread that is screw-coupled to the at least one coupling groove, head part formed in the upper part of the body part and having linear groove with diameter greater than that of the body part, and chamfer part protruded in part where the head part and the body part of the at least one screw bolt contact each other, wherein the body part is tightly adhered to the at least one receiving groove of the cover case. Corner part where the at least one receiving groove of the cover case and the at least one hole of the cover case contact each other is chamfer. The cover case is tightly adhered to the at least one coupling member.

The respective diameter of the at least one space is 10% to 30% greater than that of the at least one coupling groove. The smaller the respective diameter of the at least one coupling groove is, the greater is the respective depth of the at least one coupling groove. The at least space is formed by making upper end corner part of the at least one coupling groove as a chamfer.

The at least one coupling groove formed in the bare cell includes first coupling groove and a second coupling groove formed in a surface of the bare cell, wherein the at least one screw bolt includes a first screw bolt coupled to the first coupling groove and a second screw bolt coupled to the second coupling groove, wherein the at least one coupling member includes a first coupling member coupled to the first screw bolt and a second coupling member coupled to the second screw bolt.

The at least one coupling member includes first section soldered to the protection circuit module, second section curved in the first section and third section curved in the second section in an opposite direction of the direction that the second section is curved. The body part of the at least screw bolt passes through a at least one coupling hole formed in the third section.

An elastic member is formed between the protection circuit module and the bare cell, and supports the protection circuit module and the bare cell. The elastic member is formed in both side parts between the bare cell and the protection circuit module. The elastic member is formed of silicon and is adhered to the bare cell that is disposed in the silicon. The elastic member is formed of rubber or a foam tape, the rubber or the foam tape being adhered to the bare cell, and the protection circuit module is disposed in the foam tape.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1A:
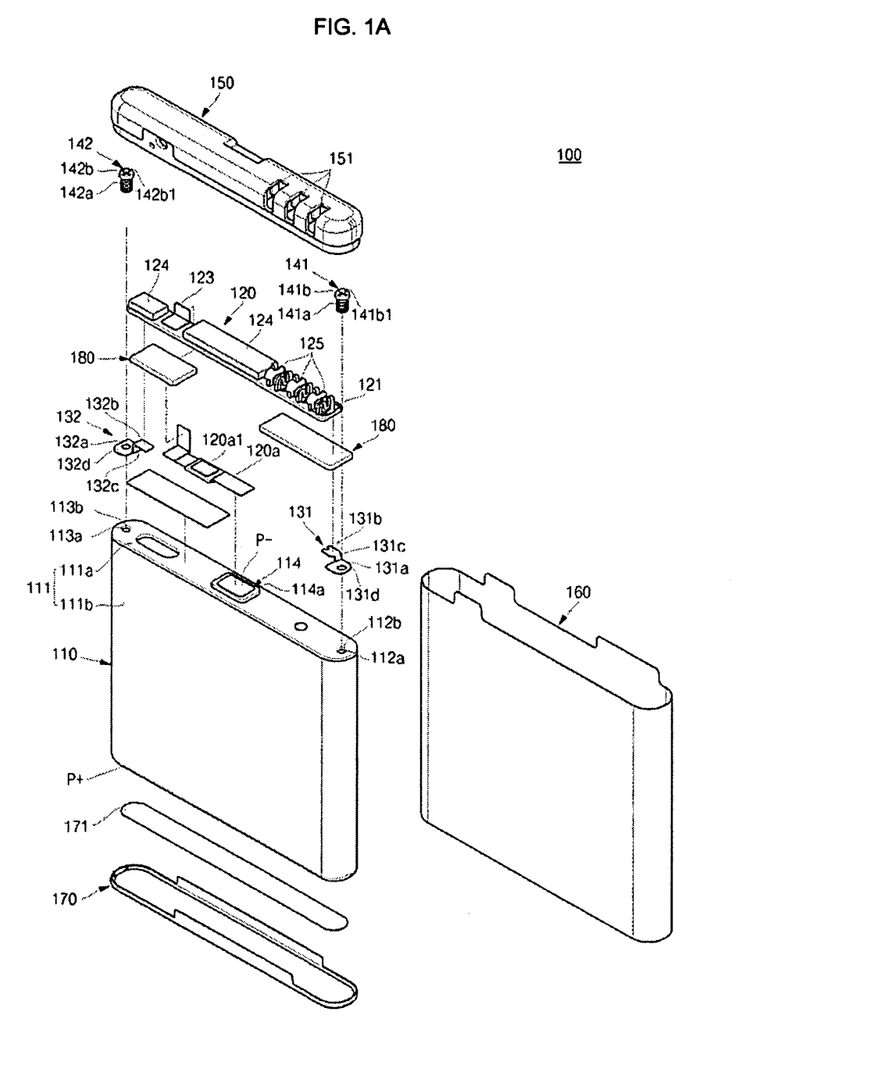
FIG. 1A is an exploded perspective view illustrating a battery pack according to an embodiment of the present invention.
Figure 1B:
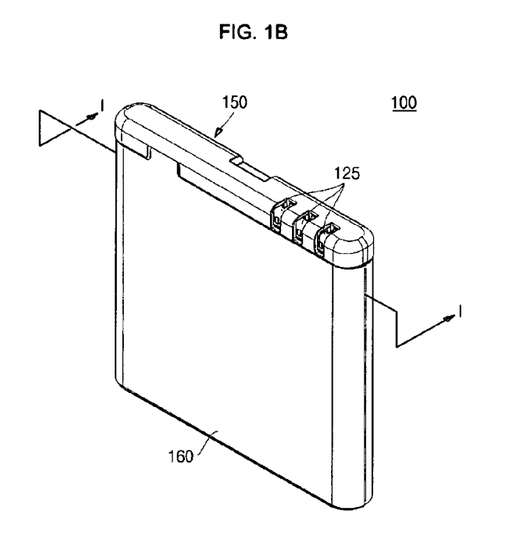
FIG. 1B is a perspective view illustrating an assembled state of the battery pack of FIG. 1A according to an embodiment of the present invention.
Figure 1C:
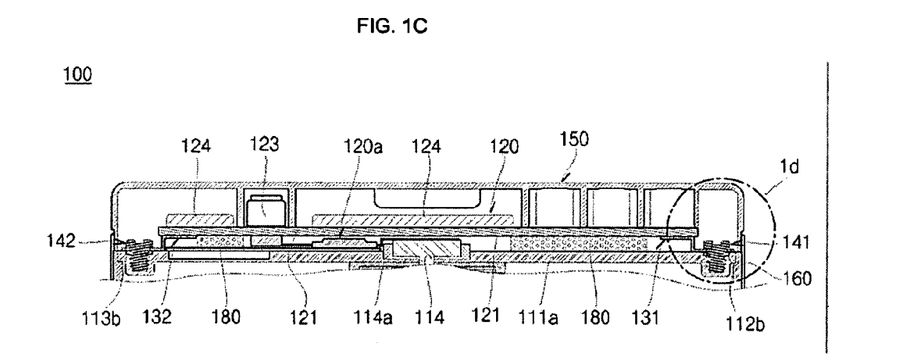
FIG. 1C is a partial cross-sectional view taken along the line I-I of FIG. 1B according to an embodiment of the present invention.
Figure 1D:
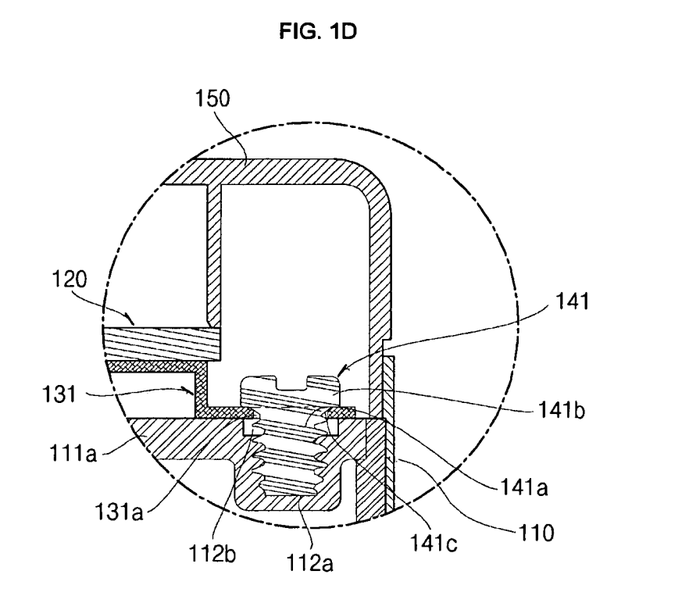
FIG. 1D is an enlarged cross-sectional view illustrating a peripheral portion of a screw bolt of FIG. 1C according to an embodiment of the present invention.
Figure 1E:
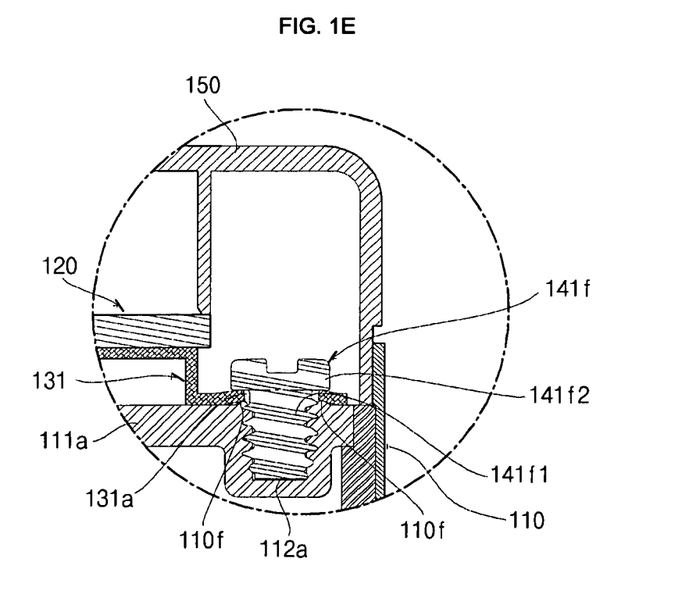
FIG. 1E is a cross-sectional view illustrating a conventional example of the peripheral portion of the screw bolt of FIG. 1D.

FIG. 1A is an exploded perspective view illustrating a battery pack according to an embodiment of the present invention. FIG. 1B is a perspective view illustrating an assembled state of the battery pack of FIG. 1A according to an embodiment of the present invention. FIG. 1C is a partial cross-sectional view taken along the line I-I of FIG. 1B according to an embodiment of the present invention. FIG. 1D is an enlarged cross-sectional view illustrating a peripheral portion of a screw bolt of FIG. 1C according to an embodiment of the present invention. FIG. 1E is a cross-sectional view illustrating a comparative example of the peripheral portion of the screw bolt of FIG. 1D according to an embodiment of the present invention.

Referring to FIGS. 1A through 1D, the battery pack 100 of the present embodiment comprises a bare cell 110, a protection circuit module 120, coupling members 131 and 132, and screw bolts 141 and 142. In the present embodiment, the coupling members 131 and 132 include a first coupling member 131 and a second coupling member 132. In the present embodiment, the screw bolts 141 and 142 include a first screw bolt 141 and a second screw bolt 142. Coupling grooves 112a and 113a formed in the bare cell 110 include a first coupling groove 112a and a second coupling groove 113a.

The bare cell 110 is a can type battery having a positive electrode and a negative electrode. The first coupling groove 112a and the second coupling groove 113a are formed in both ends of a surface of an outer part of the bare cell 110. The first screw bolt 141 is coupled to the first coupling groove 112a. The second screw bolt 142 is coupled to the second coupling groove 113a. A screw thread may be formed in an inner circumferential surface of the first coupling groove 112a and the second coupling groove 113a by the first screw bolt 141 and the second screw bolt 142. In an opening part of the first coupling groove 112a and the second coupling groove 113a formed in the bare cell 110, spaces 112b and 113b having a greater diameter than that of the first coupling groove 112a and the second coupling groove 113a are formed. Meanwhile, the bare cell 110 is the can type battery in which an electrode assembly (not shown) formed by winding a positive electrode plate (not shown), a negative electrode plate (not shown), and a separator (not shown) is sealed with a sealing assembly 111 formed of a metal material such as aluminum. The sealing assembly 111 may comprise a metal type can 111b having an opening end and a cap plate 111a closing an opening part of the can 111b. An electrode terminal 114 that is insulated by an insulator 114a may be formed in any one of the metal type can 111b and the cap plate 111a. Referring to FIGS. 1A and 1C, the electrode terminal 114 that is insulated by the insulator 114a is inserted into the cap plate 111a. The positive electrode of the bare cell 110 may be electrically connected to the sealing assembly 111. The negative electrode of the bare cell 110 may be electrically connected to the electrode terminal 114. The electrode terminal 114, which is the negative electrode of the bare cell 110, and the sealing assembly 111, which is the positive electrode of the bare cell 110, may have a different polarity. In more detail, the bare cell 110 may be the can type battery in which the electrode assembly is sealed with the sealing assembly 111 formed of the metal material, one of polarities of the electrode assembly is electrically connected to the sealing assembly 111, and another polarity thereof is connected to the electrode terminal 114. In the present embodiment, the electrode terminal 114 is electrically connected to the negative electrode plate of the electrode assembly to form the negative electrode, and the sealing assembly 111 is electrically connected to the positive electrode plate of the electrode assembly to form the positive electrode.

The protection circuit module 120 is electrically connected to the bare cell 110. The electrical connection between the protection circuit module 120 and the bare cell 110 is made by connecting the negative electrode of the protection circuit module 120 to the electrode terminal 112 that is the negative electrode of the bare cell 110 by a lead tab 120*a*, and by connecting the positive electrode of the protection circuit module 120 to the sealing assembly 110 that is the positive electrode of the bare cell 110 by the first coupling member 131. A Positive Temperature Coefficient (PTC) device 120*a*1 is electrically connected between the negative electrode of the protection circuit module 120 and the electrode terminal 114 may block the electrical connection between the negative electrode of the protection circuit module 120 and the electrode terminal 114 when a temperature excessively increases or a current excessively flows. The protection circuit module 120 may comprise an insulating substrate 121, a printed circuit pattern (not shown), a conductive pad 123, a protection circuit unit 124, and a charging/discharging terminal 125. The conductive pad 123, the protection circuit unit 124, and the charging/discharging terminal 125 may be soldered to the printed circuit pattern formed on the insulating substrate 121. The protection circuit unit 124 may selectively comprise a passive device such as a resistor, a capacitor or the like, an active device such as a field-effect transistor, a safety device such as the PTC device 120*a*1, and integrated circuits. The protection circuit unit 124 charges or discharges the bare cell 110 when the bare cell 110 is charged/discharged, and blocks a charging/discharging path of the bare cell 110 when the bare cell 110 is overheated or is in an overcurrent state, thereby preventing lifetime degradation, overheating, explosion and the like of the bare cell 110.

One end of the first coupling member 131 and the second coupling member 132 is soldered and connected to the protection circuit module 120, and another end thereof is in contact with the bare cell 110. On a surface where the first coupling member 131 and the second coupling member 132 are in contact with the bare cell 110, a first coupling hole 131*a* and a second coupling hole 132*a* corresponding to the first coupling groove 112*a* and the second coupling groove 113*a* of the bare cell 110, respectively, are formed. The first coupling member 131 and the second coupling member 132 support the protection circuit module 120 to be disposed on a surface of the bare cell 110, and electrically connect the positive electrode of the protection circuit module 120 and the bare cell 110. The first coupling member 131 and the second coupling member 132 may comprise first sections 131*b* and 132*b*, second sections 131*c* and 132*c*, and third sections 131*d* and 132*d*. Since the first coupling member 131 and the second coupling member 132 may be curved in the same manner, for example, the first section 131*b* of the first coupling member 131 is soldered and connected to the protection circuit module 120. The second section 131*c* of the first coupling member 131 is curved and formed in the first section 131*b*. The third section 132*d* of the first coupling member 131 in which the first coupling hole 131*a* is formed is curved in the second section 131*c* in an opposite direction to the direction that the first section 131*b* is curved. The second section 131*c* of the first coupling member 131 and the third section 131*d* are curved, so that the protection circuit module 120 and a surface of the bare cell 110 may be formed in parallel to each other. The first coupling groove 112*a* formed in the bare cell 110 and the first coupling hole 131*a* of the first coupling member 131 are formed corresponding to each other, so that the first screw bolt 141 may be coupled perpendicularly to the bare cell 110. Meanwhile, the second screw bolt 142 passing through the second coupling hole 132*a* formed in the third section 132*d* of the second coupling member 132 may be coupled perpendicularly to the second coupling groove 113*a*. The first coupling member 131 and the second coupling member 132 are formed of nickel or alloy including nickel, so that the coupling and conductivity between the first coupling member 131 and the second coupling member 132 and the protection circuit module 120 by soldering are enhanced. The first coupling member 131 and the second coupling member 132 are disposed to face the protection circuit module 120, so that the conductivity and coupling between the first coupling member 131 and the second coupling member 132 and the bare cell 110 are enhanced, thereby reducing contact resistance.

The first screw bolt 141 is coupled to the first coupling groove 112*a* of the bare cell 110 through the first coupling hole 131*a* formed in the first coupling member 131. The second screw bolt 142 is coupled to the second coupling groove 113*b* of the bare cell 110 through the second coupling hole 132*a* formed in the second coupling member 132. The first and second screw bolts 141 and 142 comprise body parts 141*a* and 142*a* and head parts 141*b* and 142*b*. The body parts 141*a* and 142*a* of the first and second screw bolts 141 and 142 are screw-coupled to the first coupling groove 112*a* and the second coupling groove 113*a* by forming a screw thread thereon. The head parts 141*b* and 142*b* of the first and second screw bolts 141 and 142 are formed on the upper part of the body parts 141*a* and 142*a*, and have a diameter greater than that of the body parts 141*a* and 142*a*. Grooves 141*b*1 and 142*b*1 marked with + are formed in the head parts 141*b* and 142*b* of the first and second screw bolts 141 and 142. In addition to the mark +, the grooves 141*b*1 and 142*b*1 may be marked with − and *. A screw driver is inserted into the grooves 141*b*1 and 142*b*1 so that the first and second screw bolts 141 and 142 may be screw-coupled to the bare cell 110. The first and second screw bolts 141 and 142 are coupled to the first coupling groove 112*a* and the second coupling groove 113*a* that are formed in both side parts of the bare cell 110, so that the protection circuit module 120 is not twisted, and the coupling between the first coupling member 131 and the second coupling member 132 and the protection circuit module 120 by soldering, thereby preventing an increase in contact resistance.

Referring to FIG. 1D, a chamfer part 141*c* may be formed in a part where the head part 141*b* and the body part 141*a* of the first screw bolt 141. Therefore, the chamfer part 141*c* of the first screw bolt 141 contacts the first coupling hole 131*a* formed in the first coupling member 131, which increases a contact area, thereby reducing contact resistance.

Meanwhile, the protection circuit module 120 is surrounded by a cover case to prevent a short circuit and protect it from an external impact. The cover case 150 may be hook-coupled or bonded, adhered, or taped to the protection circuit module 120 to form a cover case type battery pack. The cover case 150 along with the bare cell 110 may be surrounded with a label 160 after being coupled to the protection circuit module 120. The charging/discharging terminal 125 may be externally exposed through a charging/discharging terminal hole 151 formed in the cover case 150.

The bare cell 110 may be further surrounded by an auxiliary case 170 to protect a corner part thereof from the external impact. A dual-sided tape 171 between the auxiliary case 170 and the bare cell 110 may be formed to couple the auxiliary case 170 to the bare cell 110.

When the first coupling member 131 and the second coupling member 132 soldered to the protection circuit module 120 are coupled with the first coupling groove 112a and the second coupling groove 113a and the first and second screw bolts 141 and 142 of the bare cell 110, although the external impact is applied to the battery pack 100, contact resistance between the first coupling member 131 and the second coupling member 132 and the bare cell 110 is not reduced. In more detail, referring to FIG. 1E, a screw bolt 141f is coupled to the first coupling groove 112a formed in the bare cell 110. When the coupling member 131 connected to the bare cell 110 by the screw bolt 141f, a burr 110f is generated. The burr 110f is formed by pushing an upper surface of the coupling groove 112a by a body part 141f1 when the body part 141f1 of the screw bolt 141f is screw-coupled to the coupling groove 112a formed in the bare cell 110. The burr 110f protrudes on the upper surface of the coupling groove 112a, and is formed below a head part 141f2 of the screw bolt 141f. Therefore, when the screw bolt 141f and the coupling groove 112a are coupled, the coupling member 131 between a head part 141f2 of the screw bolt 141f and the coupling groove 112a of the bare cell 110 is tightly adhered to the burr 110f, which reduces a coupling area. When an external impact is applied to the bare cell 110, the coupling member 131 moves up and down, which further reduces the coupling area between the burr 110f and the coupling member 131. Therefore, contact resistance between the bare cell 110 and the coupling member 131 increases, so that a space 112b having a greater diameter than that of the coupling groove 112a is formed in an outer corner part of the coupling groove 112a in which a burr is formed in order to remove the burr 110f as shown in FIG. 1D. Therefore, since a part where the burr is formed is removed, although the external impact is applied to the bare cell 110 and the protection circuit module 120, contact resistance between the bare cell 110 and the coupling member 131 does not increase, thereby enhancing reliability of the battery pack 110.

On the other hand, as shown in FIGS. 1A and 1C, the battery pack 100 may further comprise an elastic member 180. The elastic member 180 formed in the battery pack 100 supports the protection circuit module 120 and the bare cell 110. When the first and second coupling members 131 and 132 are coupled to the bare cell 110 by the first and second screw bolts 141 and 142, the elastic member 180 absorbs an externally applied impact. The elastic member 180 is disposed in the bare cell 110 to generate elasticity pushing the protection circuit module 120. In more detail, the first and second coupling members 131 and 132 soldered to the protection circuit module 120 are lifted, and a force is perpendicularly applied to the head parts 141b and 142b of the first and second screw bolts 141 and 142 tightening the first and second coupling members 131 and 132. Therefore, the first and second screw bolts 141 and 142 are prevented from being released, and constant contact resistance between the first and second coupling members 131 and 132 and the bare cell 110 is maintained.

The elastic member 180, which may be formed of silicon, is coated between the bare cell 110 and the protection circuit module 120 to adhere the bare cell 110 to the protection circuit module 120, so that the protection circuit module 120 is coupled to the bare cell 110 and is prevented from moving, thereby preventing the contact resistance between the bare cell 110 and the first and second coupling members 131 and 132 from increasing.

The elastic member 180 may be formed of rubber or a foam tape including a porous material and be attached to the bare cell 110. The rubber or the foam tape absorbs an impact applied to the cover case 150 when the protection circuit module 120 is disposed to prevent the contact resistance between the protection circuit module 120 and the bare cell 110 from increasing. The rubber or the foam tape is simply attached to the bare cell 110, thereby easily manufacturing the battery pack 100.

The elastic member 180 may be formed in both side parts between the bare cell 110 and the protection circuit module 120. When the elastic member 180 is disposed in both side parts of the protection circuit module 120, since the elasticity of the elastic member 180 pushing the protection circuit module 120 can be perpendicularly transferred to the protection circuit module 120, the protection circuit module 120 may perpendicularly shake by the impact. Therefore, the elastic member 180 absorbs an impact force, and the impact is reduced, so that the contact resistance between the bare cell 110 and the protection circuit module 120 is prevented from increasing.

Figure 2:
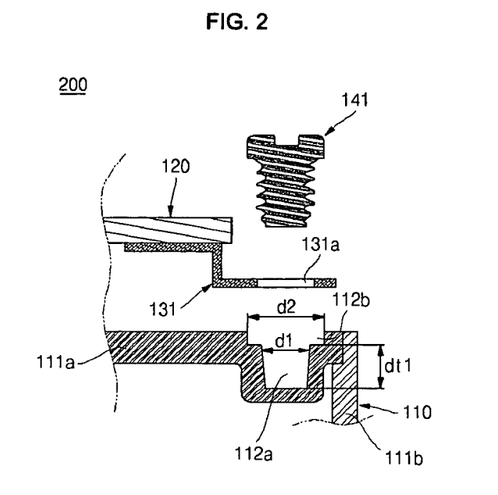
FIG. 2 is a partial cross-sectional view illustrating a dissembled battery pack according to another embodiment of the present invention.

FIG. 2 is a partial cross-sectional view illustrating a dissembled battery pack according to another embodiment of the present invention. Referring to FIG. 2, the battery pack 200 of the present embodiment comprises a bare cell 110, a protection circuit module 120, a coupling member 131, and a screw bolt 141. Since the bare cell 110, the protection circuit module 120, the coupling member 131, and the screw bolt 141 of the present embodiment are described in the previous embodiment, their descriptions are not repeated. In the present embodiment, the peripheral part of a coupling groove 112a formed in the bare cell 110 will be described.

The smaller a diameter d1 of the coupling groove 112a formed in the bare cell 110 is, the greater a depth dt1 of the coupling groove 112a is. When the screw bolt 141 passes through the coupling hole 131a of the coupling member 131 and is screw-coupled to the coupling groove 112a of the bare cell 110, since the diameter d1 is reduced in the lower part of the coupling groove 112a formed in the bare cell 110, the coupling between the screw bolt 141 and the coupling groove 112a increases. The upper part of the coupling groove 112a formed in the bare cell 110 is wider than the lower part thereof, which prevents a burr from being generated. A space 112b having a greater diameter d2 than the diameter d1 of the coupling groove 112a is formed in an opening part of the coupling groove 112a, which further prevents the burr from being generated. Therefore, the coupling between the screw bolt 141 and the coupling groove 112a is enhanced, the generation of the burr is prevented, which prevents contact resistance from increasing even when an external impact is applied to the battery pack 200.

The diameter d2 of the space 112b is 10% to 30% longer than the diameter d1 of the coupling groove 112a. If diameter d2 of the space 112b is 0% to 10% longer than the diameter d1 of the coupling groove 112a, the burr is generated around the coupling groove 112a, which may increase the contact resistance between the coupling member 131 and the bare cell 110. If the diameter d2 of the space 112b is longer than the diameter d1 of the coupling groove 112a by more than 30%, although the burr is prevented from being generated around the coupling groove 112a, a contact area between the coupling member 131 and the bare cell 110 is reduced, which increases the contact resistance between the coupling member 131 and the bare cell 110. Therefore, in this instance, the diameter d2 of the space 112b is 10% to 30% longer than the diameter d1 of the coupling groove 112a to maintain the contact resistance between the coupling member 131 and the bare cell 110 at a predetermined level value, and the burr is prevented from being generated around the coupling groove 112a, thereby preventing an increase in the contact resistance.

Figure 3A:
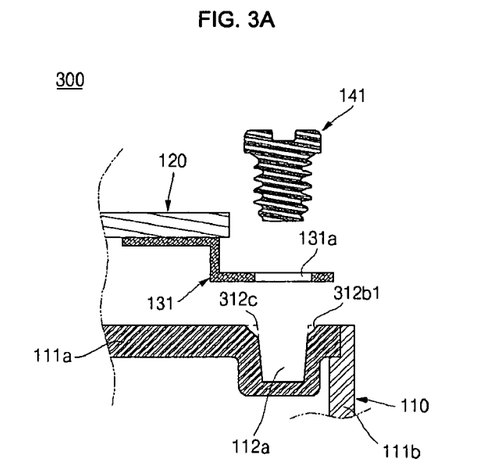
FIGS. 3A and 3B are partial cross-sectional views illustrating a battery pack according to another embodiment of the present invention.
Figure 3B:
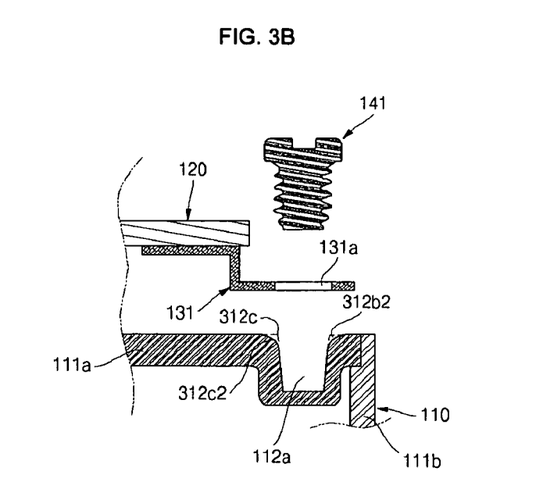

FIGS. 3A and 3B are partial cross-sectional views illustrating a battery pack according to another embodiment of the present invention. Referring to FIG. 3A, the battery pack 300 of the present embodiment comprises a bare cell 110, a protection circuit module 120, a coupling member 131, and a screw bolt 141. Since the bare cell 110, the protection circuit module 120, the coupling member 131, and the screw bolt 141 of the present embodiment are described in the previous embodiment, their descriptions are not repeated. In the present embodiment, the peripheral part of a coupling groove 112a formed in the bare cell 110 will now be described.

A corner part 312c of an upper end part of the coupling groove 112a may be a chamfer part to form a space 112b (not shown) having a greater diameter than that of a coupling groove 112a. The corner part 312c of the upper end part of the coupling groove 112a is the chamfer part 312b1. Referring to FIG. 3B, the corner part 312c of the coupling groove 112a may be a round chamfer part 312b2. If the corner part 312c of the upper end part of the coupling groove 112a is the chamfer part to form the space 112b (not shown) having a greater diameter than that of the coupling groove 112a, a burr is prevented from being generated. Therefore, an increase in contact resistance between the coupling member 131 and the bare cell 110 is prevented.

Figure 4A:
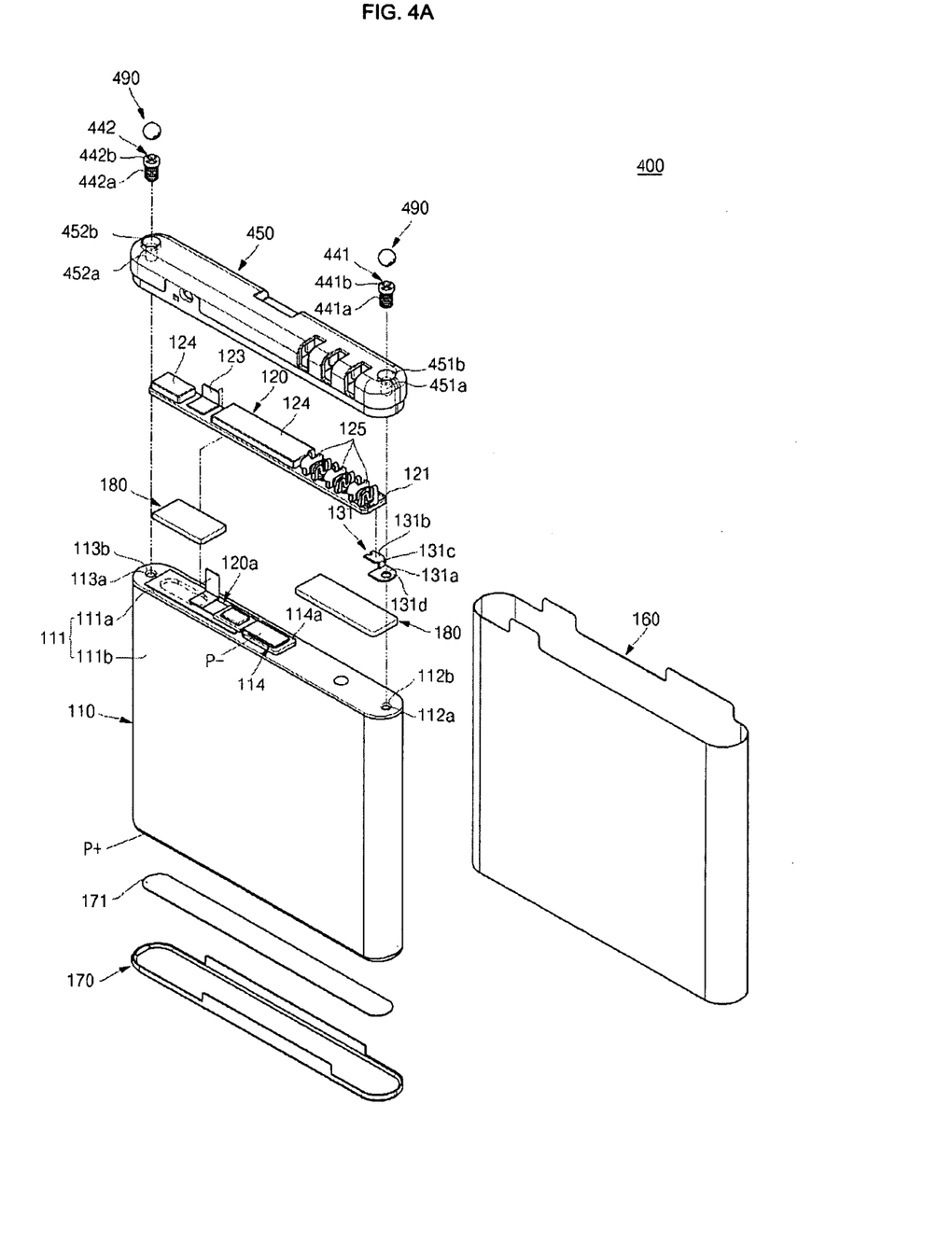
FIG. 4A is an exploded perspective view illustrating a battery pack according to another embodiment of the present invention.
Figure 4B:
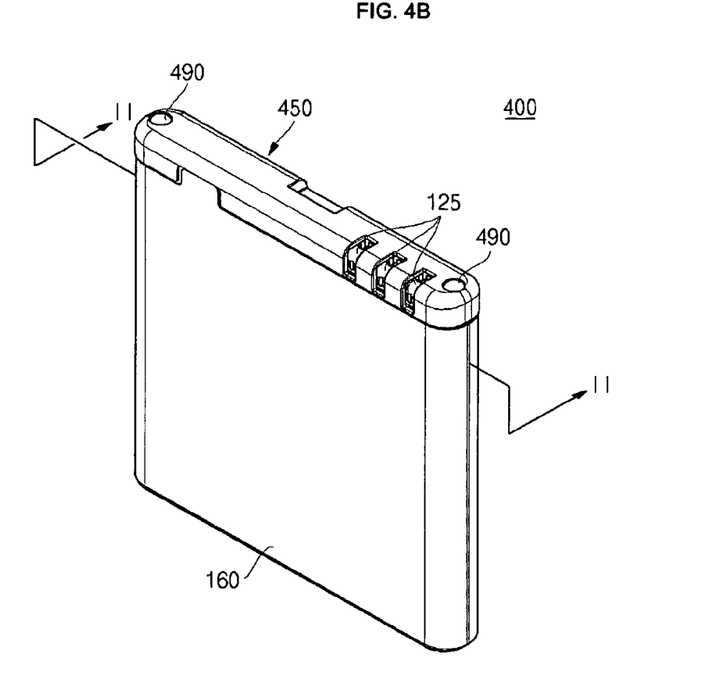
FIG. 4B is a perspective view illustrating an assembled state of the battery pack of FIG. 4A according to another embodiment of the present invention.
Figure 4C:
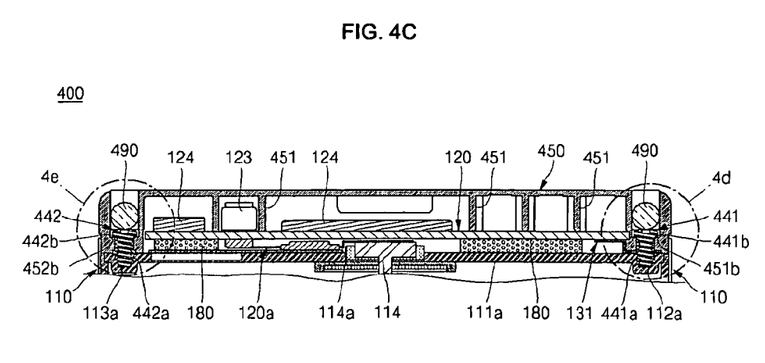
FIG. 4C is a partial cross-sectional view taken along the line II-II of FIG. 4B according to another embodiment of the present invention.
Figure 4D:
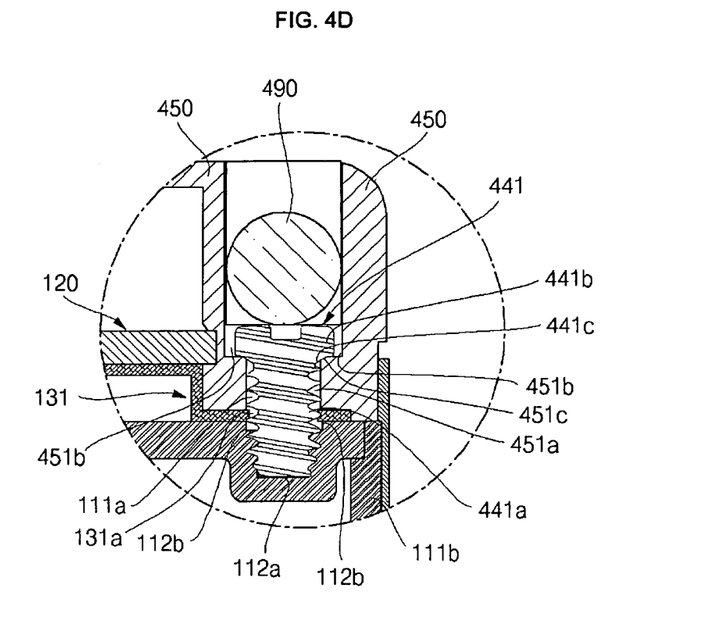
FIG. 4D is an enlarged cross-sectional view illustrating a peripheral part of a screw bolt of FIG. 4C according to another embodiment of the present invention.
Figure 4E:
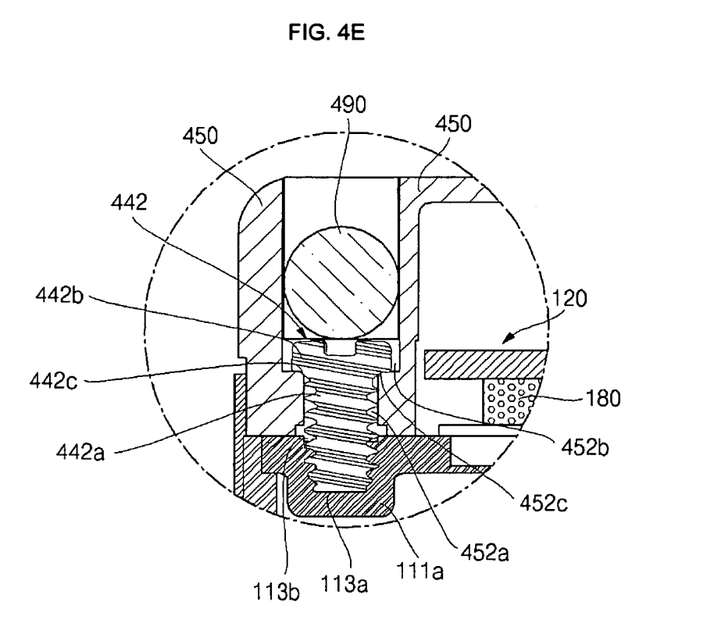
FIG. 4E is an enlarged partial cross-sectional view illustrating a peripheral part of another screw bolt of FIG. 4D according to another embodiment of the present invention.

FIG. 4A is an exploded perspective view illustrating a battery pack according to another embodiment of the present invention. FIG. 4B is a perspective view illustrating an assembled state of the battery pack of FIG. 4A according to another embodiment of the present invention. FIG. 4C is a partial cross-sectional view taken along the line II-II of FIG. 4B according to another embodiment of the present invention. FIG. 4D is an enlarged cross-sectional view illustrating a peripheral part of a screw bolt of FIG. 4C according to another embodiment of the present invention. FIG. 4E is an enlarged partial cross-sectional view illustrating a peripheral part of another screw bolt of FIG. 4C according to another embodiment of the present invention.

Referring to FIGS. 4A through 4E, the battery pack 400 of the present embodiment comprises a bare cell 110, a protection circuit module 120, a coupling member 131, screw bolts 441 and 412, and a cover case 450. The battery pack 400 further comprises an elastic member 180. The bare cell 110, the protection circuit module 120, and the coupling member 131 are described in the previous embodiment, and thus their description is not repeated. In the present embodiment, the screw bolts 441 and 442 include a first screw bolt 441 and a second screw bolt 442. Holes 451a and 452a formed in the cover case 450 are a first hole 451a and a second hole 452a, respectively. Receiving grooves 451b and 452b formed in the outer part of the first hole 451a and the second hole 452a, respectively, are a first receiving groove 451b and a second receiving groove 452b.

The first and second screw bolts 441 and 442 may comprise body parts 441a and 442a, head parts 441b and 442b, and chamfer parts 441c and 442c as described below.

The first screw bolt 441 may be coupled to the first coupling groove 112a formed in the bare cell 110 after passing through the first hole 451a formed in the cover case 450 and the coupling hole 131a formed in the coupling member 131. The head part 441b of the first screw bolt 441 may be tightly adhered to the first receiving groove 451b of the cover case 450.

The second screw bolt 442 may be coupled to the second coupling groove 113a formed in the bare cell 110 after passing through the second hole 452a formed in the cover case 450. The head part 442b of the second screw bolt 442 may be tightly adhered to the second receiving groove 452b of the cover case 450. Therefore, the first and second screw bolts 441 and 442 couples the cover case 450 to the bare cell 110.

The cover case 450 surrounds the protection circuit module 120. The first receiving groove 451b and the second receiving groove 452b are formed in the cover case 450. The first hole 451a and the second hole 452a that pass through the center of the first receiving groove 451b and the second receiving groove 452b are formed in the first receiving groove 451b and the second receiving groove 452b, respectively. The cover case 450 is a plastic case made by molding a resin material such as polycarbonate, which protects the protection circuit module 120 from an external impact and prevents a short circuit of the protection circuit module 120.

Referring to FIG. 4C, a rib 451 is formed inside the cover case 450 and supports the upper surface of the protection circuit module 120 to tightly adhere the protection circuit module 120 to the bare cell 110, which prevents the protection circuit module 120 from moving, and contact resistance between the coupling member 131 soldered to the protection circuit module 120 and the bare cell 110 from increasing.

When the first and second screw bolts 441 and 442 are coupled with the cover case 450, the cover case 450 more tightly adheres the coupling member 131 to the bare cell 110 to prevent an increase in the contact resistance the coupling member 131 and the bare cell 110.

Referring to FIGS. 4D and 4E, the chamfer parts 451c and 452c are corner parts where the first receiving groove 451b and the second receiving groove 452b of the cover case 450 and the first hole 451a and the second hole 452a of the cover case 450 contact each other. The chamfer parts 441c and 442c of the first and second screw bolts 441 and 442 are slidingly inserted into the chamfer parts 451c and 452c of the cover case 450, so that a center axis of the first hole 451a and the second hole 452a of the cover case 450 and a center axis of the first and second screw bolts 441 and 442 are disposed in the same location, thereby reducing an assembling error between the cover 450 and the first and second screw bolts 441 and 442.

The battery pack 400 tightens the cover case 450 with the first and second screw bolts 441 and 442 and is integrally formed with the bare cell 110. The cover case 450 tightly adheres the protection circuit module 120 to prevent the protection circuit module 120 from moving. In addition, the coupling member 131 that is soldered to the protection circuit module 120 and is electrically connected to the bare cell 110 is tightly adhered to the cover case 450, thereby preventing the increase in the contact resistance. Meanwhile, when the first screw bolt 441 is coupled to the first coupling groove 112a of the bare cell 110, a space 112b having a greater diameter than that of the first coupling groove 112a is formed in the upper end port of the first coupling groove 112a to prevent a burr from being generated, thereby preventing the increase in the contact resistance due to an external impact.

As shown in FIGS. 4A and 4C, an elastic member 180 formed in the battery pack 400 supports the protection circuit module 120 and the bare cell 110. The elastic member 180 absorbs an externally applied impact when the cover case 450 is coupled to the bare cell 110 through the first and second screw bolts 441 and 442. In more detail, since the cover case 450 is coupled to the first and second screw bolts 441 and 442, an impact applied to the cover case 450 is transferred to the first and second screw bolts 441 and 442, so that the first and second screw bolts 441 and 442 shake, which may weaken the coupling between the first and second coupling grooves 112a and 113a formed in the bare cell 110 and the first and second screw bolts 441 and 442. If the impact is continuously applied to the cover case 450, since the coupling between the bare cell 110 and the first and second screw bolts 441 and 442, contact resistance between the coupling member 131 tightly adhered to the first screw bolt 441 and the bare cell 110 may increase. Therefore, if the elastic member 180 is inserted into the protection circuit module 120 and the bare cell 110, and the cover case 450 and the bare cell 110 are coupled through the first and second screw bolts 441 and 442, the protection circuit module 120 presses the elastic member 180. The elastic member 180 disposed in the bare cell 110 pushes the protection circuit module 120, so that the first receiving groove 451b and the second receiving groove 452b of the cover case 450 perpendicularly push the head parts 441b and 442b of the first and second screw bolts 441 and 442. Therefore, the coupling between the bare cell 110 and the first and second screw bolts 441 and 442 is enhanced, which prevents the increase in the contact resistance due to the external impact. Since the elastic member 180 absorbs the impact applied to the cover case 450, the impact transferred to the first and second screw bolts 441 and 442 can be reduced, which can prevent the contact resistance between the bare cell 110 and the coupling member 131 from increasing.

Meanwhile, the receiving grooves 451b and 452b formed in the cover case 450 are coupled to the first and second screw bolts 441 and 442 and are sealed with a sealing member 490 formed of rubber or silicon, thereby preventing impurities from inserting into the receiving grooves 451b and 452b. Therefore, the first and second screw bolts 441 and 442 do not corrode due to impurities, so that the coupling between the first and second screw bolts 441 and 442 and the bare cell 110 can be maintained. Thus, the coupling between the bare cell 110 and the cover case 450 is further maintained, which prevents the increase in the contact resistance between the bare cell 110 and the coupling member 131 due to the external impact.

The battery pack according to aspects of the present invention does not increase contact resistance between a bare cell and a protection circuit module against an external impact.

Further, the battery pack according to aspects of the present invention enhances assembling and convenience of process thereof while preventing the contact resistance between the bare cell and the protection circuit module.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A battery pack comprising:
a bare cell having a bare cell surface;
at least one recess structure formed in the bare cell and recessed from the bare cell surface, the recess structure comprising a coupling groove and a non-coupling portion;
a protection circuit module arranged over the bare cell surface and electrically connected to the bare cell;
at least one coupling member having one portion coupled to the protection circuit module and another portion contacting the bare cell surface, the at least one coupling member comprising a coupling hole aligned with the at least one recess structure;
at least one screw bolt coupled to the coupling groove of the at least one recess structure through the coupling hole of the at least one coupling member; and
the non-coupling portion located in an opening part of the at least one recess structure and wider than the coupling groove, wherein a gap is formed within the recess structure between the screw bolt and an inner wall of the non-coupling portion; wherein the at least one screw bolt comprises a screw head, wherein the non-coupling portion is disposed between the screw head and the coupling groove.

2. The battery pack of claim 1, wherein each of the coupling groove and the non-coupling portion has a diameter, wherein the diameter of the non-coupling portion is 10 % to 30 % greater than that of the coupling groove.

3. The battery pack of claim 1, wherein the non-coupling portion comprise a chamfered edge of the recess structure.

4. The battery pack of claim 1, wherein the at least one recess structure includes a first recess structure comprising a first coupling groove and a second recess structure comprising a second coupling groove,
wherein the at least one screw bolt includes a first screw bolt coupled to the first coupling groove and a second screw bolt coupled to the second coupling groove,
wherein the at least one coupling member includes a first coupling member coupled to the first screw bolt and a second coupling member coupled to the second screw bolt.

5. The battery pack of claim 2, wherein the diameter of the coupling groove decreases as it is farther from the bare cell surface.

6. The battery pack of claim 1, wherein the at least one screw bolt includes a body having a screw thread that is screw-coupled with the coupling groove of the at least one recess structure, and a chamfer interposed between the head and the body, wherein the chamfer is in contact with the at least one coupling member.

7. The battery pack of claim 1, wherein the at least one coupling member includes first section soldered to the protection circuit module, a second section bent from the first section, and a third section bent from the second section, wherein the coupling hole is formed in the third section.

8. The battery pack of claim 1, further comprising an elastic member between the protection circuit module and the bare cell, and wherein the elastic supports the protection circuit module and the bare cell.

* * * * *